Aug. 12, 1941. H. D. HUME 2,252,180
BAT AND TINE CONSTRUCTION FOR HARVESTER REELS
Filed Jan. 13, 1940
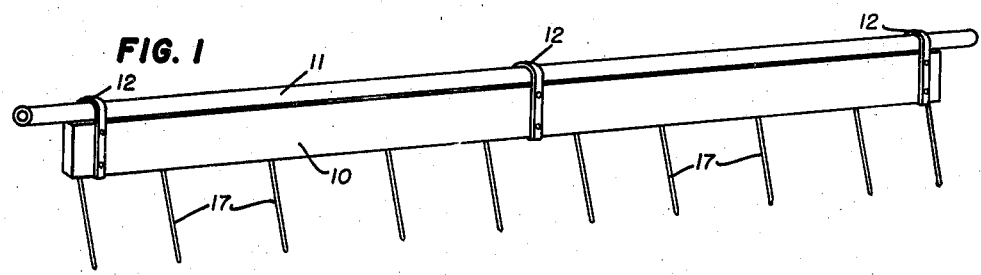
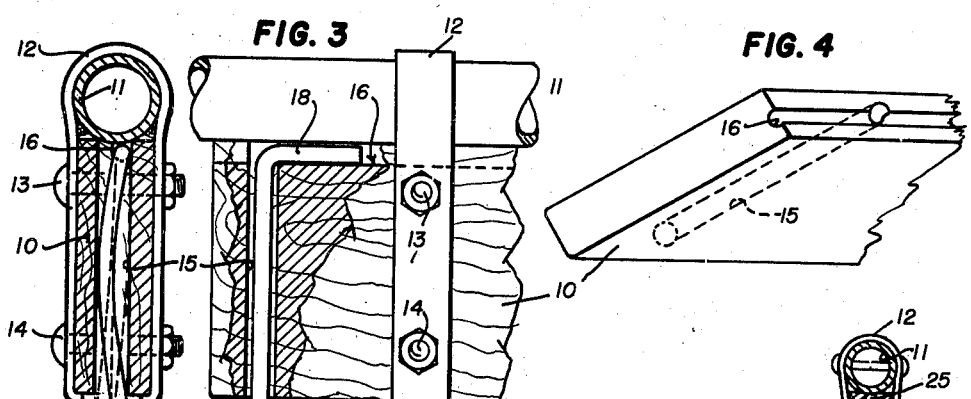
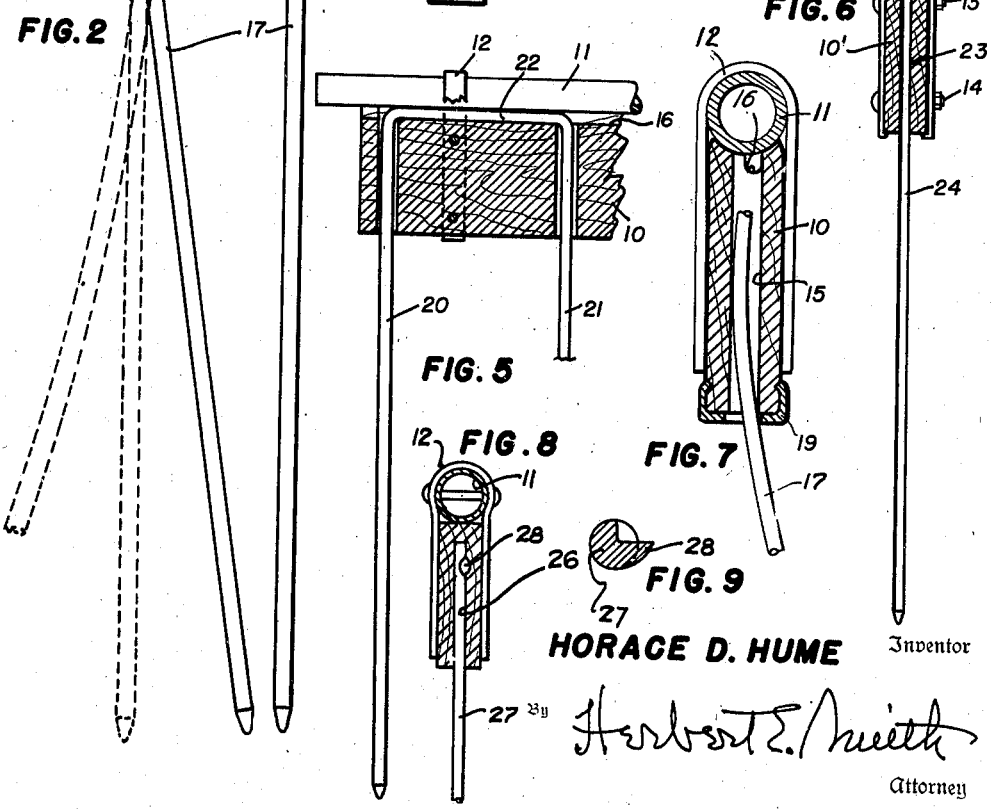
HORACE D. HUME, Inventor Patented Aug. 12, 1941

2,252,180

UNITED STATES PATENT OFFICE 2,252,180

BAT AND TINE CONSTRUCTION FOR HARVESTER REELS

Horace D. Hume, Garfield, Wash.

Application January 13, 1940, Serial No. 313,742

10 Claims. (Cl. 56—219)

My present invention relates to improvements in bat and tine construction for harvester reels employed on harvesting machines in connection with the reciprocating cutter of the sickle type to gather or pick up the crop, transfer it to the sickle and then lift or pass the cut crop to the usual draper or carrier, which disposes of the crop in suitable manner.

The rotary reel in which my bats and tines are preferably used is of the type which embodies supplemental movement in addition to its usual rotary movement, and the bats and tines mounted on the reel are also given supplement or feathering movement to enhance the efficiency of the reel in the performance of its functions.

With the utilization of the supplemental movement in both the reel and the tines the successive forwardly descending tines are caused to dip into the crop, pick up the grain or vines and pass them to the sickle and then as the successive rows of tines ascend rearwardly, they lift and pass the cut crop to the draper or carrier.

My invention is directed particularly to the construction and operation of the bat and of the fingers or tines that are mounted on the bat and which in turn are pivotally supported upon the reel structure proper that is located at the front of the harvesting machine, and which revolves or rotates on a horizontal axis.

My invention consists in certain novel combinations and arrangements of parts involving the reel bat and its tines or fingers associated together to provide for long-time use, extreme lightness in construction, and the capabilities of meeting extreme conditions without rupture or breakage that is imposed on frequent occasions during operation. In the accompanying drawing I have illustrated one complete example of the physical embodiment of my invention wherein the parts are combined and arranged according to the mode I have thus far devised for the practical application of the principles of my invention.

Figure 1 is a perspective view of a reel bat shaft, a bat, and tines in their normally associated position, Figure 2 is a cross-sectional view taken on the lines 2—2 of Figure 1 showing the cooperation of the several parts making up the assembled device.

Figure 3 is a fragmentary view partly broken away of the bat shaft, the bat, a tine, and an assembly clip, Figure 4 is a fragmentary view in perspective of one of the bats comprising the present invention, Figure 5 is a fragmentary view partially in section of one end of the bat and shaft assembly showing an alternate form of tine, Figure 6 is a cross-sectional view taken on a plane similar to Figure 2 and showing a modified form of bat and tine arrangement, Figure 7 is a cross-sectional view through a bat taken at the point of one of the bores therethrough and showing a bat clip or reinforcing member to serve as a wear-resister, and showing also the upper edge of the bat arranged to conform to the curvature of the bat shaft.

Figure 8 is a cross-sectional view taken on a plane similar to Figures 2 and 6 and showing a further modified form of the bat and tine arrangement of my invention in which the tine is provided with alternate retainer means, and Figure 9 is an enlarged cross-sectional view through the tine of Figure 8 and showing its retainer means.

In order that the utility of the invention and the general arrangement and relation of parts may be readily understood, I have shown in Figure 1 a perspective view of a complete assembly of bat and tines and the bat shaft, which it will be understood is but one of a multiple number of light assemblies mounted upon the usual spider heads, which in turn are supported upon a horizontally disposed shaft and to which the spider heads are secured. The bat assemblies being pivotally mounted in extreme ends of the spiders are provided with means for providing the feathering movement, which is the preferred form to enhance the picking up of vine crops or low-lying crops so that the sickle or cutter may cut the stalks of the crop and not destroy a portion of the valuable part of the crop.

The work of the reel is also enhanced by reason of its construction and operation which permits lifting and passing the crop to the draper or carrier rearwardly of the reel.

The bat 10 forming a part of the present invention is usually a wooden strip secured to a bat shaft 11, in which to secure lightness a tubular type shaft is preferred. At intervals along the length of the bat and the bat shaft are secured holder clips 12 which are U-shaped to fit the size of the shaft and which are bolted to the bat by the bolts 13 and 14. In my preferred construction for these U-clips 12, I usually arrange that the diameter of the shaft is slightly greater than the thickness of the bat so that when the bolt 13 is tightened sufficiently the pull of the bolt will cause the bat to be immovably fixed with respect to the shaft 11.

Along the length of the bat and at spaced intervals a vertical bore 15 is provided through the bat, and in the upper edge or adjacent the bat shaft I provide a longitudinal groove 16 communicating with the series of bores 15. Tines 17 are provided with a head 18 formed by bending the portion 18 at right angles to the tine. These tines are inserted into the vertical bores 15 in the bat with the heads 18 resting in the groove 16 where the tines will be firmly held when the bat is finally adjusted to the bat shaft. The material of the tines is highly resilient so that when obstructions that are immovable are encountered during the operation of the reel in the field, the tines may freely bend and return to their normal position whenever they have passed an encountered obstruction.

In the form of use pictured in Figure 2 I preferably use a tine that is slightly curved and which curvature is at right angles to the bent portion 18 forming the head of the tines. Instead of boring the holes 15 the size of the tines, I make these holes somewhat larger so that a part of the bent portion of the shank of the tine will have freedom of movement in the bore when an obstruction is encountered and so that the tine shaft or shank may flex and have extreme opportunity to save itself from destruction when encountering a severe condition. In Figure 2 I have illustrated in dotted lines several positions that the tine may take during the period when it is under extreme stress, and by forming the bore 15 considerably larger than the diameter of the tine, or by forming an elongated hole in the direction of travel of the tines, I am enabled in my light construction to provide a practically indestructible bat and tine combination.

To further reinforce the bat at the point where the greatest pressure and wear would normally take place, the use of a clip 19 or a band the length of the bat may be provided on the lower or free edge of the bat, and spaced holes are provided in this band to admit passing the tine therethrough. Experience has shown, however, that such a clip or band is not always necessary since the wear is not excessive over a considerable period of time.

While I have shown in Figure 3 the usual form of head 18 for the tines, I have shown in Figure 5 a modified form in which two tines 20, 21 may be formed U-shaped having a cross-head 22 as shown and with the tines spaced to meet the spacing of the bores 15 in the bats, and such a construction is preferable only when many severe conditions of use have to be met. Such conditions as I have in mind would consist of tangled growth or of use in extremely rocky ground, or ground on which there were boulders or other obstructions among the crop.

Through the use of the construction pointed out herein I have provided a simplified streamlined form in bat and tine construction which permits of a minimum amount of clogging or wrapping of crop about the sweeping elements comprising the bat and the tine, and I have also materially reduced the weight of a reel, which because of its position in front of a cutter bar is usually difficult to support in a manner permitting the meeting of extreme conditions and in performing a maximum of service in conjunction with the other parts of the harvesting machine.

In Figure 6, a further modification of my invention is shown. In this instance the bat 10' has the usual longitudinal groove 16 in its upper edge, but the lateral bore 23 is substantially the diameter of the tine 24. Tine 24 is secured in the same manner as tine 17, with its head 25 resting in the longitudinal groove 16, but, as shown, the tine is not curved.

The modified form of bat and tine construction shown in Figure 8 discloses a bat 10' having a bore 26 terminating below the upper edge of the bat. This bore is slightly smaller than the cross-section of the tine 27, which is inserted in the bore and sets tightly against dislodgement. Additional anchoring of the tine in the bat is accomplished by means of retainers 28 on the shank and over that area of the tine which is inserted into the bat. In Figure 8 is shown but one of these retainers, but it is to be understood that they may be used in any multiple number as desired and may be of various forms and dimensions.

The form disclosed in Figure 9, wherein the portion of the tine shank is distorted to form a tooth or extension 28, is one practical form. In this instance the tine was struck in such a manner that the metal forming the tine is forced out of the periphery thereof and extends substantially as a tooth or prong to bite into the material of the bat.

That portion of the tine extending beyond the bat in this latter case, as well as in the other forms, may be curved or bent according to the preferred mode of use and according to the kind of crop operated upon.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention, what I claim as new and desire to secure by Letters Patent is:

1. A bat for harvester reels comprising a bat shaft, a wooden bat having a series of spaced lateral holes and a depression adjacent to one side of the upper end of each said holes, means for securing said bat to said shaft, and a tine mounted in each said hole and having a head offset in the direction of and resting in the adjacent depression.

2. A bat for harvester reels comprising a bat shaft, a wooden bat having a series of spaced lateral holes and a longitudinally extending depression adjacent to one side of the upper end of each said hole, means for securing said bat to said shaft, and a tine mounted in each said hole and having a head offset in the direction of and resting in the adjacent depression.

3. A bat for harvester reels comprising a bat shaft, a wooden bat having a series of spaced lateral holes and a longitudinal groove along its upper face, means for securing said bat to said shaft, and a tine mounted in each said hole and having a head offset in the direction of and lying in said groove.

4. A bat for harvester reels comprising a bat shaft, a wooden bat having a series of spaced lateral holes and a groove along its upper face extending longitudinally of said bat to one side of the central axis of said lateral holes, means for securing said bat to said shaft, and a tine mounted in each said hole and having a head offset in the direction of and resting in said groove.

5. A bat for harvester reels comprising a bat shaft, a wooden bat having a series of spaced lateral holes and a depression adjacent to one side of the upper end of each said holes, means for securing said bat to said shaft, a tine mounted in each said hole and having a head resting in the adjacent depression, and reinforcing means secured to the underside of said bat and encircling the lower end of each said hole.

6. A bat for harvester reels comprising a bat shaft, a bat having a series of spaced lateral bores and a longitudinal depression adjacent the upper end of each said bore, a tine mounted in each of said bores and comprising a body portion of substantially less diameter than said lateral bore and having an upper curved portion positioned in said lateral bore and lower crop contacting portions, each of said tines also having a right angle head resting in the depression adjacent the hole in which the tine is mounted, and means for securing said bat to said shaft.

7. A bat for harvester reels comprising a bat shaft, a bat having a series of spaced lateral holes, a tine having a curved portion mounted in each of said holes and comprising a body portion of substantially less diameter than said lateral hole, said tines each having a head resting in a depression adjacent the hole in which the tine is mounted, and means for securing said bat to said shaft.

8. A bat for harvester reels comprising a bat shaft, a bat having a series of spaced lateral holes and longitudinal depressions adjacent the upper end of each of said holes, a curved tine mounted in each of said holes and comprising a body portion of substantially less diameter than said lateral holes, each said tine having a right angle head resting in a depression adjacent the hole in which the tine is mounted, and means for securing said bat to said shaft.

9. A bat for harvester reels, a bat having a series of spaced lateral holes and groove depressions between adjoining pairs of said holes adjacent the upper termini thereof, a U-shaped member having each leg comprising a tine adapted to be mounted in one of adjoining pairs of holes, the cross head of said U-shaped member lying in the groove depression between the holes in which the tines of said member are mounted, and means for securing said bat to said bat shaft.

10. A bat for harvester reels comprising a bat shaft, a bat having a series of spaced lateral holes and longitudinal depressions adjacent the upper termini of said holes, a tine mounted in each of said holes and comprising a body portion of substantially less diameter than said lateral hole and having a curved portion positioned wholly in said lateral hole and a lower straight crop-contacting portion, said tine also having a right angle head resting in a depression adjacent the hole in which the tine is mounted, and means for securing the bat to the bat shaft.

HORACE D. HUME.